(No Model.)
J. R. FRANCE.
WATERPROOF FABRIC.
No. 481,485. Patented Aug. 23, 1892.
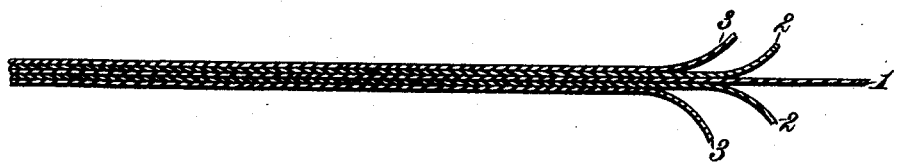
Witnesses,
Robert Everitt
J. A. Rutherford
Inventor.
Joseph R. France.
By
James L. Norris,
Atty.

UNITED STATES PATENT OFFICE.

JOSEPH R. FRANCE, OF NEW YORK, N. Y.

WATERPROOF FABRIC.

SPECIFICATION forming part of Letters Patent No. 481,485, dated August 23, 1892.

Application filed January 9, 1892. Serial No. 417,602. (No specimens.)

*To all whom it may concern:*

Be it known that I, JOSEPH R. FRANCE, a citizen of the United States, residing at New York, in the county of New York and State of New York, have invented a new and useful Improvement in Waterproof Fabrics, of which the following is a specification.

This invention relates to a new fabric for use in the manufacture of waterproof wearing-apparel, but more particularly to that branch of manufacture connected with waterproof collars, cuffs, and shirt bosoms or fronts. With the rapid growth and demand for paper collars many years ago there arose a demand for collars and cuffs that would not be affected by perspiration, and attempts were made to make paper collars waterproof. Recognizing the want, rubber was looked to to remedy the defect and rubber collars were made, and, while the compound appeared to have many advantages, it also had many drawbacks. It could not be made white enough, and it turned yellower still from the sulphur used to cure it. To remedy this defect, Pease, in Patent No. 38,122, sought to enamel rubber by covering it with enameled cloth or leather, the same or in similar manner to that used for making enameled leather. It was not, however, until the advent and discovery of pyroxyline compounds that much advance was made in waterproof collars and cuffs and shirt-fronts. With the introduction in England of this pyroxyline compound (first made there and afterward perfected here and now so well known under the names of "pyralin" and "celluloid") it was at once recognized as being desirable for this use, being entirely waterproof, very white as to color, and so plastic as to be readily manipulated, and therefore among the earliest inventions and uses named for which this new compound could be applied we have collars and cuffs and wearing-apparel. Much was therefore expected of the new compound, and one of the first to apply it to use was Lewthwaite, who conceived the idea of coating or spreading the compound in a semi-liquid state upon muslin for this purpose, and to which it will readily adhere with little compression; but this invention did not prove successful, not because it was not practical, but because the earlier inventors of this compound were met with many difficulties in its manufacture difficult to overcome and because the compound was not thoroughly understood. At a later date Sanborn, Kanouse & Sanborn commenced to manufacture waterproof collars and cuffs by using muslin for an interlining; but they had this advantage over Lewthwaite that they used thin sheets of celluloid, between which the muslin was placed and by heat and pressure united. All pyroxyline compounds readily adhere to muslin or to any filamentous substance. Collars and cuffs have been successfully made in this way, and large quantities have been sold and are well known; but with all the advantages of manufacture now so well known they have many objections arising from the rigid nature of the muslin interlining and the warping and shrinking of the celluloid compound and the fraying and tearing out of the buttonhole.

Another method of interlining has been mentioned and a patent granted therefor—viz., the use of metal as an interlining; but this is too rigid and only increases the defect, and, so far as I am aware, they have never been manufactured to any extent. This is also true of another method also patented for paper alone as an interlining; but this is not waterproof, and therefore impractical.

Collars, cuffs, and shirt bosoms or fronts have also been very extensively manufactured by cutting out of a single piece or a sheet of pyroxyline compound the suitable blanks for collars and cuffs and making them up without any interlining, and in some cases the buttonholes have been reinforced in various ways. The demand for this class of goods has been very large for the reason that in a measure they remedied the defects of the interlined goods. It seemed, however, to be desirable to secure a fabric that would combine some of the elasticity of rubber compounds with the color and texture of pyroxyline compounds, and I therefore sought for a base of union between the two, but owing to the great difficulty in uniting rubber to pyroxyline compounds was not successful. The various substances with which rubber could be coated would not adhere to the pyralin, and it was not until I found that paper could be attached to rubber before being cured and while in its sticky condition and would remain so attached during and after the process of vulcanization that I could effect a union of both. As a partial remedy of the defects existing in the manufacture of such collars and cuffs and shirt-fronts as were made from solid pyralin—that is, from sheets of the material without an interlining—I had perfected methods of reinforcing or strengthening the buttonholes by the use of flexible skin and also elastic membranes, such as rubber compounds, and as set forth in patents to me dated January 7, 1890, No. 418,787, and February 18, 1890, No. 421,860. A later patent was also issued to me April 8, 1890, No. 424,129, in which I have shown a method of remedying the defect in breakage of turn-over collars and which refers to that class of collars made from two pieces of pyralin, from one of the pieces of which a longitudinal section has been cut to facilitate the folding operation.

Sheets of pyroxyline compounds when cut very thin—say from four one-thousandths to eight one-thousandths of an inch in thickness—are very elastic and pliable; but as they increase in thickness they become less so. By attaching them to another substance more elastic than themselves I obtain an article that overcomes all the objections hitherto urged against waterproof collars and cuffs and shirt-fronts as heretofore made. In accomplishing this object I use as an interlining the new fabric mentioned in the specification of my application, Serial No. 417,601, filed of even date herewith.

The method of manufacture I have fully set forth in that application, and which I will only name here as involving a sheet 1 of rubber compound or caoutchouc, to one or both sides of which a sheet 2 of filamentous substance—such, for instance, as paper—is attached. To this base I attach a thin sheet 3 of pyralin to one or both sides, as may be required, as described in my application, Serial No. 417,603, filed of even date herewith.

In the manufacture of various articles of wearing-apparel—such as collars, cuffs, and shirt-fronts—the fabric can be prepared in large sheets and subsequently used as required by attaching sheets of pyralin or similar pyroxyline compounds to them. This can be accomplished in any of the usual well-known ways, one of which is to place a sheet of the before-mentioned new fabric (rubber coated with paper) between two sheets of pyralin and in turn place them between metal plates, and after superimposing a number of these in a pile of, say, twelve or fourteen or more place in a hydraulic press having upper and lower steam-tables for heating and subsequent cooling and heat and press them in the usual well-known manner. If it is desirable to produce the compound sheets with a finish on them resembling linen, this is accomplished by placing sheets or pieces of muslin or linen of the proper size between the pyralin and the metal before placing them in the press. The heat and pressure causes the pyralin to flow into all the interstices of the muslin or linen against which it is pressed, and although on close inspection it will be observed that the surface of the pyralin has on it the reverse of the indentations on the linen or muslin, yet to an ordinary observer they will look like muslin and answer just as well for all practical purposes.

In the drawing the figure is a sectional view, on an enlarged scale, showing a portion of the improved fabric.

The numeral 1 indicates the sheet of rubber compound or caoutchouc, 2 the sheets of paper or other filamentous substance, and 3 the thin sheets of pyralin or other pyroxyline material.

In the use of the word "pyralin" I refer to a pyroxyline compound now well known in the market and which is similar to the compound known as "celluloid."

Having thus described my invention, what I claim is—

As an improved article of manufacture, a waterproof fabric consisting of a sheet of rubber, a sheet of fibrous material—such as thin paper—attached to the sheet of rubber, and a covering of pyroxyline compound secured to the sheet of fibrous material, substantially as described.

In testimony whereof I have hereunto set my hand and affixed my seal in presence of two subscribing witnesses.

JOSEPH R. FRANCE. [L. S.]

Witnesses:
RICHARD J. SICKELS,
CARL STEINKE.